(12) United States Patent
Mullin

(10) Patent No.: US 8,719,584 B2
(45) Date of Patent: May 6, 2014

(54) MOBILE, WIRELESS HAND-HELD BIOMETRIC CAPTURE, PROCESSING AND COMMUNICATION SYSTEM AND METHOD FOR BIOMETRIC IDENTIFICATION

(75) Inventor: Sean G. Mullin, Manomet, MA (US)

(73) Assignee: Bi2 Technologies, LLC, Plymouth, MA (US)

( * ) Notice: Subject to any disclaimer, the term of this patent is extended or adjusted under 35 U.S.C. 154(b) by 138 days.

(21) Appl. No.: 13/281,589

(22) Filed: Oct. 26, 2011

(65) Prior Publication Data

US 2012/0102332 A1    Apr. 26, 2012

Related U.S. Application Data

(60) Provisional application No. 61/406,766, filed on Oct. 26, 2010.

(51) Int. Cl.
  *G06F 21/00* (2013.01)

(52) U.S. Cl.
  USPC .......................................... 713/186; 713/182

(58) Field of Classification Search
  USPC .................................................. 713/182, 186
  See application file for complete search history.

(56) References Cited

U.S. PATENT DOCUMENTS

| | | | |
|---|---|---|---|
| 4,641,349 A | 2/1987 | Flom et al. | |
| 5,291,560 A * | 3/1994 | Daugman | 382/117 |
| 6,289,113 B1 | 9/2001 | McHugh et al. | |
| 6,483,930 B1 | 11/2002 | Musgrave et al. | |
| 6,532,298 B1 | 3/2003 | Cambier et al. | |
| 6,917,902 B2 | 7/2005 | Alexander | |
| 6,950,536 B2 | 9/2005 | Houvener | |
| 7,016,532 B2 | 3/2006 | Boncyk et al. | |
| 7,346,195 B2 | 3/2008 | Lauper et al. | |
| 7,493,496 B2 | 2/2009 | Smith et al. | |
| 7,512,254 B2 | 3/2009 | Vollkommer et al. | |
| 7,587,070 B2 | 9/2009 | Myers et al. | |

(Continued)

FOREIGN PATENT DOCUMENTS

EP    1833002 A1    9/2007

OTHER PUBLICATIONS

Kang, Jin-Suk, "Mobile iris recognition systems: An emerging biometric technology" International Conference on Computational Science, ICCS 2010, Procedia Computer Science 1 (2010) 475-484, www.sciencedirect.com.

(Continued)

*Primary Examiner* — Vu Le
*Assistant Examiner* — Tracy Mangialaschi
(74) *Attorney, Agent, or Firm* — Barlow, Josephs & Holmes, Ltd.

(57) ABSTRACT

A mobile, wireless biometric identification system includes a biometric capture device, associated software and processes which enable a commercially available wireless communication device, such as a smartphone, using a commercially established wireless communication networks, to capture a digital image of a human biometric (iris, fingerprint, etc.) for transmission via a secure connection to a central server. The capture device is designed to focus on the difficult task of capturing the highest possible quality image for encoding and comparison, while the overall system is designed to leverage the existing cellular communication network. At the server level, the server system receives the image, encodes the image to a biometric template, and compares the encoded template to a plurality of reference templates stored in a database to identify the individual. Identification data is then transmitted back to the smartphone device and displayed.

30 Claims, 11 Drawing Sheets

(56) References Cited

U.S. PATENT DOCUMENTS

| | | | |
|---|---|---|---|
| 7,689,005 | B2 | 3/2010 | Wang et al. |
| 2003/0048175 | A1 | 3/2003 | Wang et al. |
| 2003/0093298 | A1* | 5/2003 | Hernandez et al. ............... 705/2 |
| 2005/0138394 | A1 | 6/2005 | Poinsenet et al. |
| 2005/0238208 | A1* | 10/2005 | Sim .............................. 382/115 |
| 2005/0238210 | A1 | 10/2005 | Sim |
| 2006/0013446 | A1 | 1/2006 | Stephens |
| 2006/0013447 | A1 | 1/2006 | Siegel et al. |
| 2007/0297149 | A1* | 12/2007 | Richardson et al. .......... 361/731 |
| 2010/0183199 | A1 | 7/2010 | Smith et al. |
| 2011/0212699 | A1* | 9/2011 | Howard et al. ............ 455/404.1 |

OTHER PUBLICATIONS

Negin, Michael et al., "An Iris Biometric System for Public and Personal Use", IEEE Computer Society, Feb. 2000 pp. 70-75.

Xi, Kai et al., "Biometric Mobile Template Protection: A Composite Feature based Fingerprint Fuzzy Vault", IEEE International Conference on Communications, Jun. 2009.

Kang, Byung Jun et al., "A new multi-unit iris authentication based on quality assessment and score level fusion for mobile phones", Machine Vision and Applications vol. 21, Issue 4, Jun. 2010 pp. 541-553.

Motorola White Paper, "Mobile Biometric Identification", Motorola 2008 (Retrieved on Dec. 15, 2012). Retrieved from Internet: URL:http://www.motorola.com/web/Business/Products/Biometrics/Mobile%20AFIS/Mobile%20AFIS/_Documents/Static%20Files/Mobile20%Identification%20White20%Paper.pdf—entire document.

Cox, "Eyeball-scanning iPhone used by cops to ID suspects", Networkworld.com., Jul. 21, 2011. (Retrieved on Dec. 27, 2012). Retrieved from the Internet: URL: http://www.networkworld.com/news/2011/072111-iphone-eyeball-scanning.html—entire document.

* cited by examiner

MOBILE, WIRELESS HAND-HELD BIOMETRIC CAPTURE, PROCESSING AND COMMUNICATION SYSTEM AND METHOD FOR BIOMETRIC IDENTIFICATION

BACKGROUND OF THE INVENTION

The instant invention relates to biometric identification systems and more particularly to a mobile, hand-held biometric processing and communication system which captures an image of a biometric attribute, such as an iris or fingerprint, verifies the quality of the image, wirelessly transmits the image to a central database server for matching, and wirelessly receives results provided by the server, as well as relevant information about the identified person.

Biometric identification systems based on fingerprints and the iris are well known in the prior art. For the most part, the prior art systems rely on fixed, i.e. wired, computer networks and they are not deployed in portable systems.

One biometric technology, that is a particular focus of the present invention, involves the visual examination of the attributes of the iris of the human eye. The iris of the human eye has random patterns of striations, ciliary processes, crypts, rings, furrows and other features which are shown to be capable of generating highly unique biometric templates for personal identification. Reference is made to U.S. Pat. No. 4,641,349, "Iris Recognition System", issued to Flom et al., and U.S. Pat. No. 5,291,560, "Biometric Personal Identification System Based on Iris Analysis", issued to Daugman. These patents are directed to biometric identification methods wherein the visible texture of a person's iris can be used to distinguish one person from another with great accuracy.

A typical iris recognition system, as currently known in the art, involves the use of an imager to video image the iris of a person to be identified, an encoding means for processing and encoding the image to produce a unique biometric template, and processing means for comparing the encoded template with templates stored in a database. Specific methods of generating templates and comparing templates are also well known in the art as exemplified by '560 patent to Daugman identified hereinabove. These templates may be used to identify individual irises in a 1-to-n comparison with extremely low error rates.

While these systems have been implemented in fixed installations with a high degree of success and market recognition, the prior art systems have been limited to fixed, hard-wired systems, which can leverage the speed and processing power of larger computer systems. The known iris identification systems capture the iris images using stationary optical platforms that are large, complex, and expensive, and the systems are difficult to use, even with cooperation of the subject being identified. As a result, their usefulness in many real-time applications is limited.

Although the art of biometric recognition systems is well developed, there still remain problems inherent in these technologies, particularly the lack of a portable or handheld device specifically designed to solve the problems inherent in capturing a close-up, high-quality, properly focused image of the face, or iris of the eye. Therefore, a need exists for a portable, hand-held biometric capture device that overcomes the drawbacks of the prior art.

SUMMARY OF THE INVENTION

The instant invention provides a biometric processing and communication system comprising a commercially available, handheld wireless communication device, such as an iPhone™, iPad™, Android™, or Blackberry™ mobile communication device, or other mobile communication device, and a dedicated biometric processing device piggybacked onto the communication device (iPhone™, iPad™, Android™, and Blackberry™ are trademarks of their respective owners). Associated software and processes enable the system, using commercially established wireless communication networks, to capture and process a digital image of a human biometric (fingerprint, iris, etc.) for transmission via a secure and encrypted internet connection to a central server.

The biometric processing device of the system is designed to focus on the difficult task of capturing the highest possible quality image for encoding and comparison. The process intensive tasks of encoding the obtained image to a digital template an then comparing the encoded template to all of the reference templates are not completed on the handheld system. Rather, the handheld system uses the established and functional technologies of the wireless communication device for transmitting the obtained image to a back-end server system. At the server level, the back-end server system receives the image, encodes the image of the biometric to a unique digital template, and compares the template with templates stored in a database to verify the identity of an individual previously enrolled in the database. If a match is obtained, the server transmits the identification data back to the handheld system for display on the system.

As indicated in the background, the core technologies for encoding biometric attributes to a unique template, and comparing the templates to render a match are known in the prior art. The back end server systems and database architecture for storing data are also well known in the art. Individuals are enrolled into the system by creating a database record including the individual's personal data, such as name, address, date of birth, social security number and a photograph. Each record also includes a biometric template, such as a fingerprint template, and/or an iris template obtained from the individual at the time of enrollment. In this manner, each individual enrolled in the system has a reference template for comparison.

Generally, the biometric processing and communication system comprises a commercially available handheld wireless communication device, such as an iPhone™, iPad™, Android™ cell phone or any other mobile PDA communication device, and a biometric processing device which is designed to work in conjunction with the wireless communication device. The system relies on the existing cell communication network to provide secure, reliable data communication between the system and the back-end database server of the system. The system also utilizes the existing touch screen display of the wireless communication device for input/output of the system, display of a graphical user interface system, and display of images from the capture module during the image acquisition process.

The handheld wireless communication device comprises a housing having an external surface, a central processing unit, a battery power source, a touch screen display, a long range wireless communication transceiver (cell, wi-fi or RF), a short range wireless communication transceiver (Bluetooth or Ultra-Wide Broadband (UWB) and an electrical input/output (I/O) connector.

The biometric processing device comprises a housing having an interior cavity contoured to conform to the exterior surface of the housing of the handheld wireless communication device, a docking port including an electrical input/output (I/O) connector within the interior cavity, and a window in a front surface thereof in communication with the interior cavity.

The handheld wireless communication device is removably seated in mated relation within the interior cavity of the housing of the biometric processing device wherein the touch screen display of the handheld communication device is accessible through the window of the housing of the biometric processing device.

The biometric processing device further comprises a biometric capture module, a short range wireless communication transceiver, a central processing unit, and a battery power source. A software application running on the central processing unit of the biometric processing device is operative for sending data to and receiving data from the wireless communication device through either the short range wireless communication transceivers or the electrical I/O connectors, controlling the biometric capture module to capture an image of a biometric attribute of a person to be identified, qualifying the captured image as being of acceptable quality for encoding into a biometric template, and transferring the qualified image to the wireless communication device.

Another software application runs on the central processing unit of the handheld wireless communication device and is operative for providing a graphical user interface on the touch screen display for control of the biometric processing device and the wireless communication device. The software application receives control input from a user through the touch screen display, communicates the control input to the central processing unit of the biometric processing device through the short range wireless communication transceiver or the electrical I/O connectors, receives the qualified image from the biometric processing device, communicates with a communication network through the long range wireless communication transceiver, communicates with a remote computer network connected to the communication network, transmits the qualified image over the communication network to the computer network for encoding the qualified image to a biometric attribute template and comparison of the encoded biometric attribute template to a plurality of reference templates stored in the network accessible database, receives identification data from the computer network over the communication network responsive to the comparison, and displays the identification data on the touch screen display.

Of particular concern and interest for the present invention is the acquisition of the highest possible quality image for transmission back to the server. One of the fundamental problems in implementing a mobile system is the acquisition of a quality image for encoding and comparison. The prior art systems rely on highly complex, fixed systems which can reliably acquire a high-quality image.

The present system provides a unique division of processing where the biometric processing device focuses on obtaining a high-quality image, and the back end server is used to encode the image and compare the image. The division of processing power provides the ability to quickly obtain the iris image at the point of identification, and then once the image is transmitted, the high-power servers can quickly process the image, encode the image and compare it to the database for verification of identification. Once the image is transmitted to the server, the server can encode, compare and provide results in under 5 seconds. This unique division of resources and computing power allows the biometric processing system to only focus on the critical job of obtaining a high-quality image for encoding.

Once the results are provided, the end user can have access to a variety of different information linked to the identified individual. The system can be linked to criminal records database to return outstanding warrants, or to a health care system to return critical health information for a health care provider.

Accordingly, among the objects of the instant invention are: the provision of a hand-held biometric processing device that cooperates with a commercially available wireless communication device to capture, process and store a digital image of a human biometric attribute;

the provision of a hand-held biometric processing device that uses the communication services of the wireless communication device to communicate with a remote server using commercially available wireless networks;

the provision of a hand-held biometric processing device that enables a user to capture a high-quality digital image of a human biometric attribute;

the provision of a hand-held biometric processing device that enables a user to capture a high-quality digital image of a human iris;

the provision of a hand-held biometric processing device that also includes a fingerprint acquisition module;

the provision of a hand-held biometric processing device that utilizes the existing display and input/output interfaces (wired and/or wireless) of a commercially available wireless communication device to operate the biometric processing device;

the provision of hand-held biometric communication and processing system where the computing power of the on-board processor is utilized to analyze and process images of the iris in real-time to capture, analyze and rate the quality of each frame of a stream of captured video frames to generate the highest possible quality of image for encoding; and Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention.

DESCRIPTION OF THE PREFERRED EMBODIMENT

Figure 1:
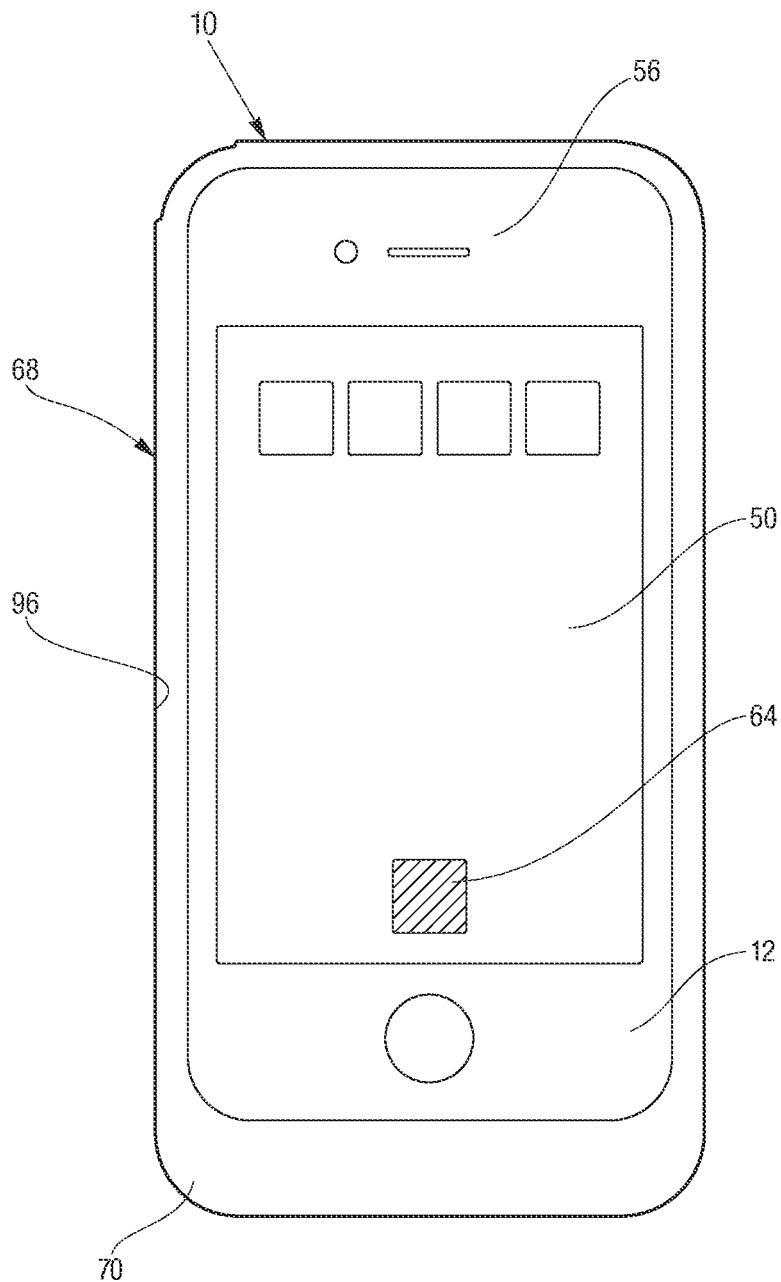
FIG. 1 is a front view of the biometric processing and communication system in accordance with the teachings of the present invention.

Referring now to the drawings, the biometric processing and communication system of the instant invention is illustrated and generally indicated at 10 in FIGS. 1-11. As will hereinafter be more fully described, the instant invention provides a biometric processing and communication system 10 comprising a commercially available wireless communication device generally indicated at 12, a biometric processing device generally indicated at 14, and associated software and processes which enable the handheld wireless communication device 12, using commercially established wireless communication networks, to capture and process a digital image 16 of a human biometric attribute, for transmission via a secure and encrypted internet connection to a remote server.

The term "human biometric attribute" or "biometric attribute" is intended to encompass fingerprints, facial features, iris, retina, and any other attribute, which is unique to an individual and can be scanned and compared to a reference. The present disclosure focuses primarily on the human iris and secondarily fingerprints. However, the scope of the invention should not be so limited to any attribute listed herein. The focus of the invention is the provision of a portable hand-held system that captures a high-quality image 16 and then uses the existing communication links of an established communication system to transmit the captured image 16 to a remote server for encoding into a digital template and comparison to a plurality of reference templates stored in a database.

Figure 9:
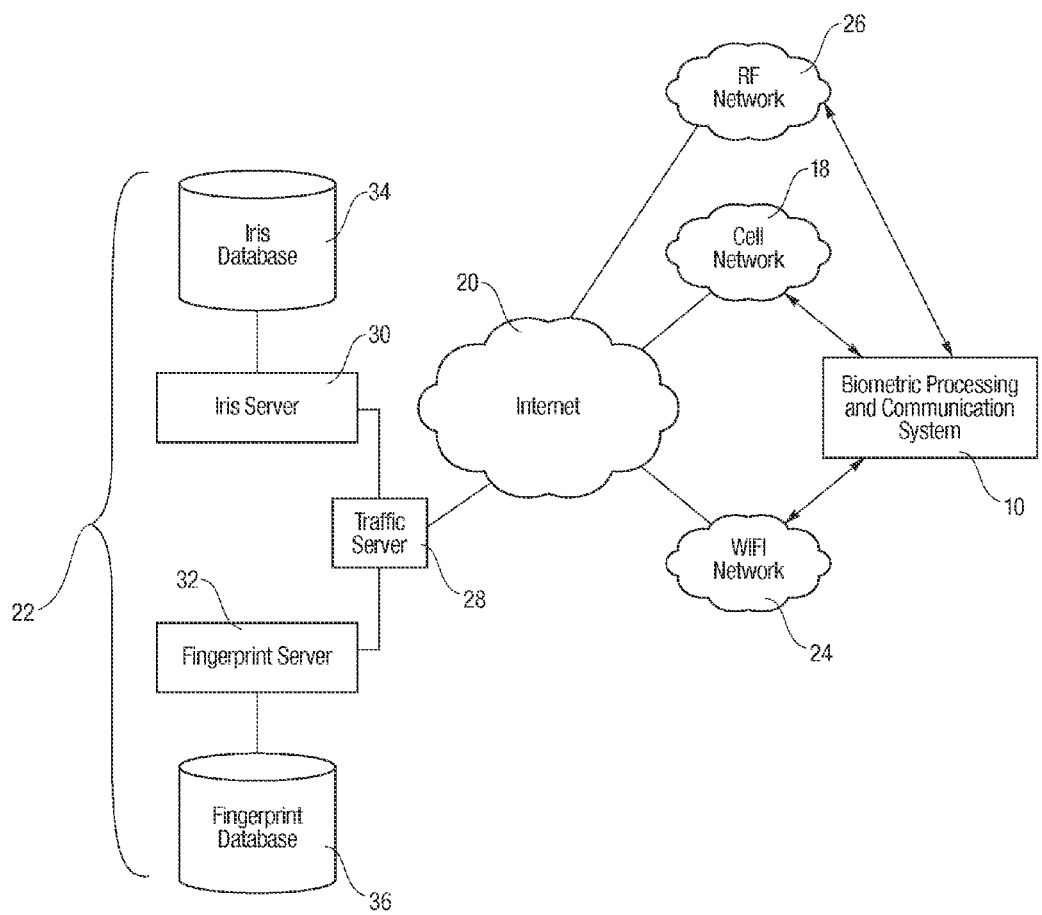
FIG. 9 is a schematic block diagram of the overall communication network between the wireless communication device and the back end database server.

A block diagram of the overall system is best illustrated in FIG. 9. At the handheld system level, the biometric processing and communication system 10 captures an image 16 of a biometric attribute of the individual to be identified. The handheld system 10 transmits that image through an existing cell communication network 18, through the world-wide web 20 and eventually to a remote server system 22. Alternatively, the image 16 could be transmitted through a secure WIFI network 24 provided at the local site level, or even further through an existing radio (RF) network 26.

At the server system 22, a traffic server 28 receives the acquired image 16, directs the image 16 to an appropriate encoding/comparison server 30,32 based on the type of image 16 (iris or fingerprint). The server 30,32 encodes the image 16 to a unique digital template, and compares the template with templates stored in a database 34, 36 to verify the identity of an individual previously enrolled in the database 34,36. The results of the comparison are then in turn transmitted back to the handheld system 10 to provide identification, verify identification or indicate there is no match.

In the context of the present invention, it is currently preferred that separate databases 34,36 will be maintained for identifying individuals based on iris templates or fingerprint templates. The reason for separating the databases 34,36 is primarily to improve encoding and matching speeds. However, it should be noted that there are limitless possibilities for the architecture of the back-end server systems and databases, and that the illustrated embodiment is just one demonstrative example.

Once identification is verified, the servers 28, 30, 32 may also be connected to other databases (not shown), such as a criminal records database or a health care database, and can return further information to the end user. Potential ends users include, but are not limited to, police officers and sheriffs in the field, border patrol agents in the field, field nurses, doctors, and EMT's at the scene of an accident.

As indicated in the background, the core technologies for encoding the images 16 of the biometrics to unique digital templates, and comparing the templates to those in an existing database to render a match are known in the prior art.

In accordance with the invention, individuals are enrolled into the system by creating a database record including the individual's personal data, such as name, address, date of birth, and social security number. Each record also includes a facial photograph and/or an iris image and template, and/or a fingerprint image and template, each obtained from the individual at the time of enrollment. In this manner, each individual enrolled in the system has a unique reference template for comparison.

Turning back to FIGS. 1-8, the biometric processing and communication system 10 comprises a biometric processing device 14 which is intended to work in conjunction with a commercially available wireless communication device 12 such as an iPhone™, iPad™, Android™, or Blackberry™ cell phone, or any other mobile PDA communication device. While these specific devices are identified herein, the scope of the invention is not intended to be limited to either of these devices. Any mobile wireless device could serve as the communication part of the proposed capture and processing system.

Figure 6:
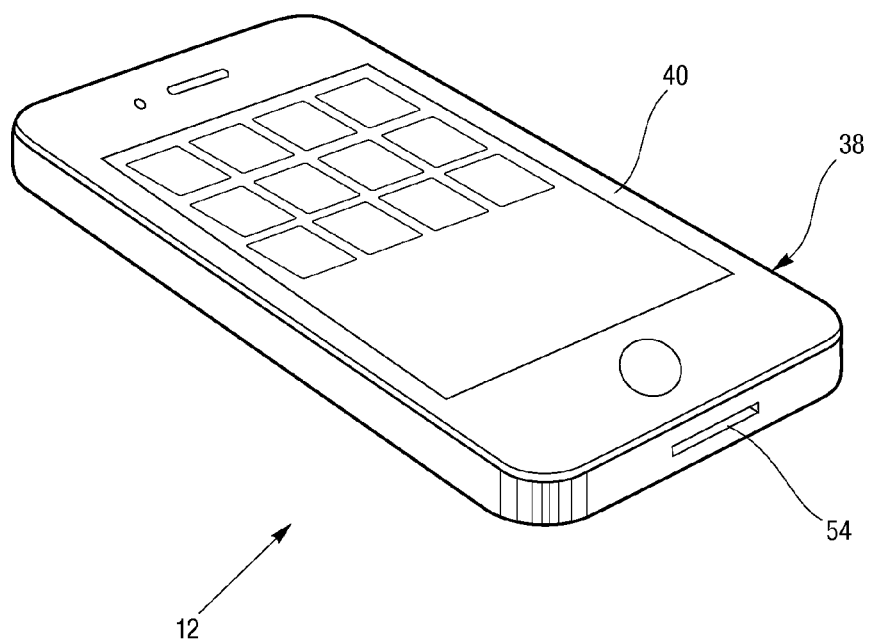
FIG. 6 is a perspective view of a representative wireless communication device.
Figure 7:
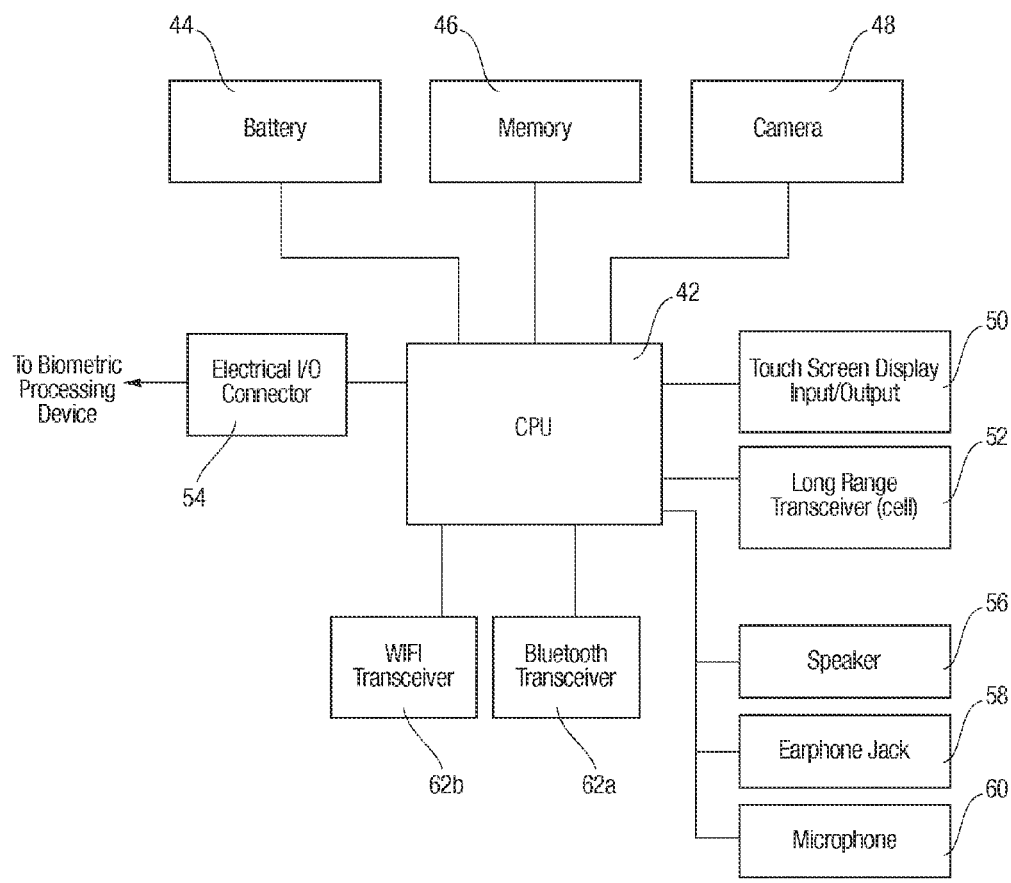
FIG. 7 is a schematic block diagram of the electronic components of the wireless communication apparatus.
Figure 8:
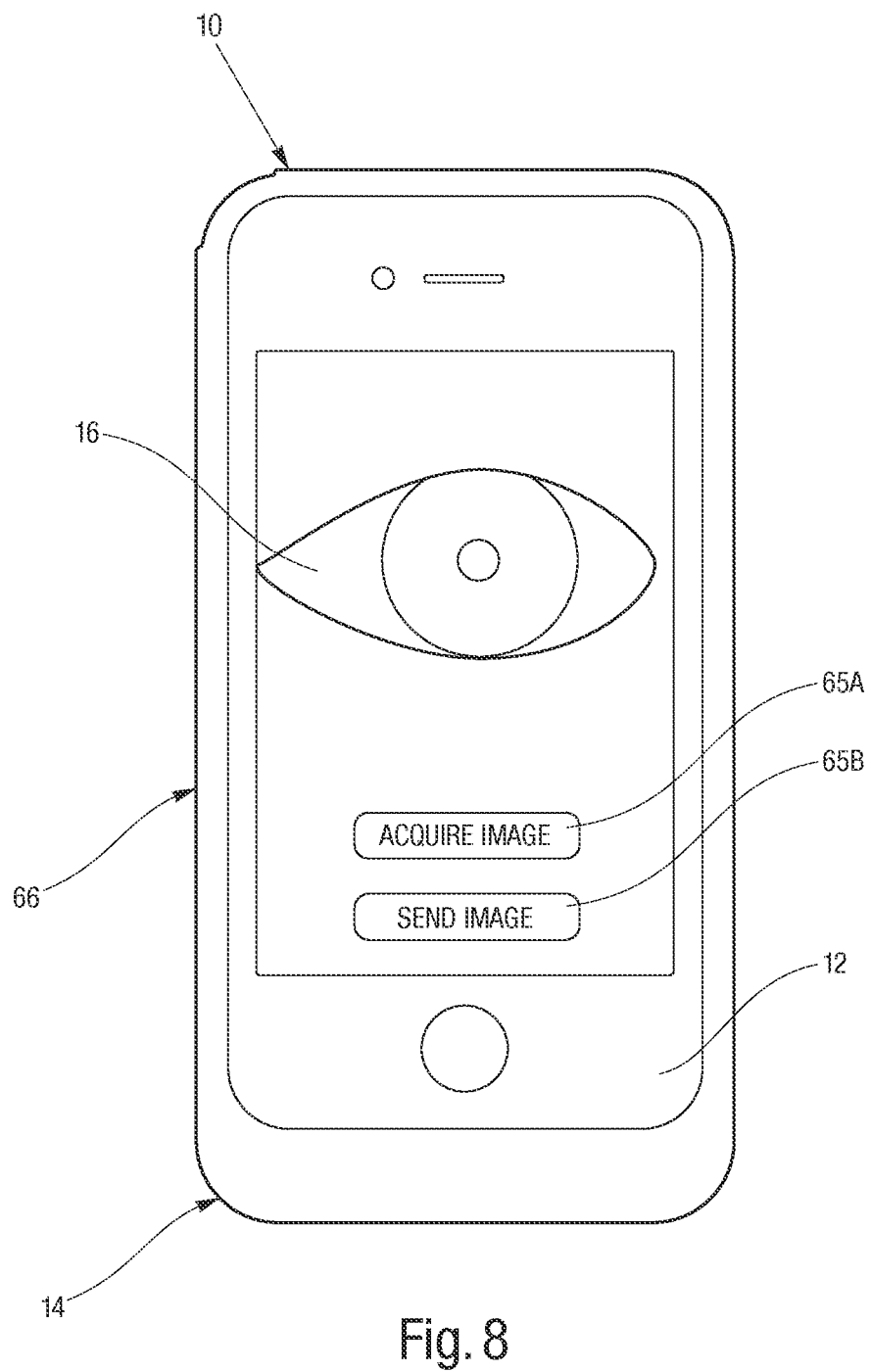
FIG. 8 is a front view of the biometric processing and communication system showing the graphical user interface displayed on the wireless communication device.

For purposes of description only, an iPhone™ device is illustrated in FIGS. 6 and 7 as a representative handheld wireless communication device 12. However, the scope of the invention should not be limited by the specific details of this one device. More specifically, referring to FIGS. 6 and 7, the handheld wireless communication device 12 generally comprises a housing 38 having an external surface 40, a central processing unit (CPU) 42, a battery power source 44, a memory 46, a digital camera 48, a touch screen display 50, a long range communication transceiver 52, and an electrical input/output (I/O) connector 54 for communicating with external devices such as the biometric processing device 14, and/or a computer, battery charger, etc. The handheld wireless device 12 further includes a speaker 56, earphone jack 58, and a microphone 60. Still further, the device 12 includes a short-range communication transceiver 62, such as a Bluetooth transceiver 62A and/or a WIFI transceiver 62B. The architecture and functioning of these components are all well-known in the art.

The biometric processing device 14 relies on the existing cell communication network 18 as used by the wireless communication device 12 (iPhone™) to provide secure, reliable data communication between the handheld system 10 and the back-end database server 22 of the system. The biometric processing device 14 also utilizes the existing touch screen display 50 of the wireless communication device 12 (iPhone™) for input/output of the device 14, display of a graphical user interface system, and display of images 16 from the biometric processing device 14 during the image acquisition process.

A proprietary software application is loaded onto the wireless communication device 12 (see FIG. 1—MORIS™ icon 64) to provide an easy to use graphical user interface (GUI) and controls for establishing communication with the back-end server 22, acquiring the images 16 and then sending the images 16 to the server 22 for encoding and matching with the databases 34,36 (MORIS™ is a trademark of BI2™ Technologies, LLC). The GUI is also used for controlling acquisition of each biometric image 16, i.e. iris or fingerprint.

As indicated above, of particular concern and interest for the present invention is the acquisition of the highest possible quality image 16 of the iris for transmission back to the server 22. One of the fundamental problems in implementing a mobile biometric iris identification system is the acquisition of a quality image 16 for encoding and comparison. The prior art systems rely on highly complex, fixed systems with expensive lenses and video capture devices which can reliably acquire a high-quality image.

Referring again to FIGS. 1-5, the biometric capture and processing device 14 comprises a compact housing 66 including a rear portion 68 and a front portion 70 which snap together to form a ruggedized shell for enclosing the wireless communication device 12. The rear housing portion 68, best illustrated in FIG. 4 houses the various components of the biometric capture device 14. The front surfaces 72 of the rear housing portion 68 and the rear surfaces (not shown) of the front housing portion 70 are contoured to conform to the exterior surface 40 of the wireless communication device 12 so that it is snugly seated and secured within an interior cavity 74 (shown in broken line in FIG. 3) within the device 14. Different housing versions will be required for the various different mobile communication devices. The interior bottom wall includes an electrical input/output (I/O) connector 76, which mates with the connector 54 of the wireless communication device 12 to provide communication and data transfer between the two devices 12,14. The connector 76 will obviously match the respective connector 54 of the wireless communication device 12. In the case of the iPhone™ as illustrated, the top corner of the rear housing portion 68 includes an aperture 78 for the existing camera 48 on the wireless communication device 12. The aperture 78 may be in a different location for a different device.

Figure 2:
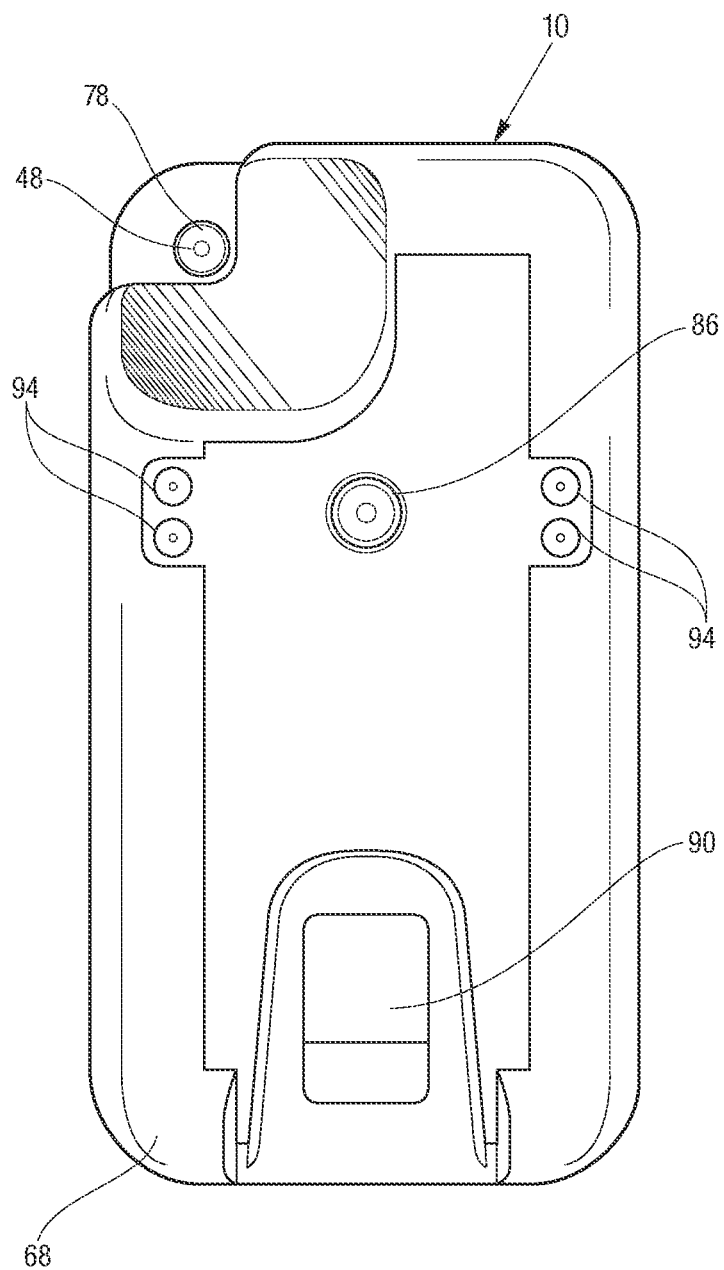
FIG. 2 is a rear view thereof.
Figure 3:
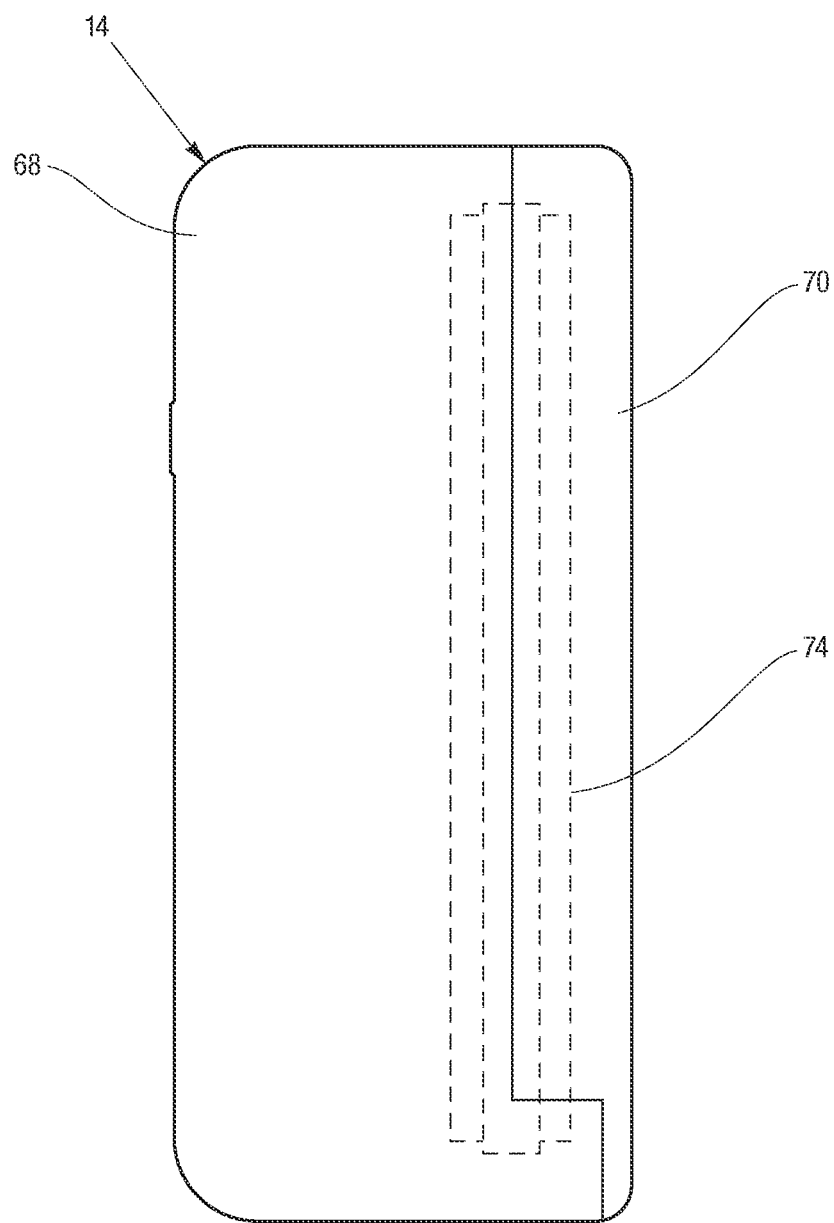
FIG. 3 is a side view thereof.
Figure 4:
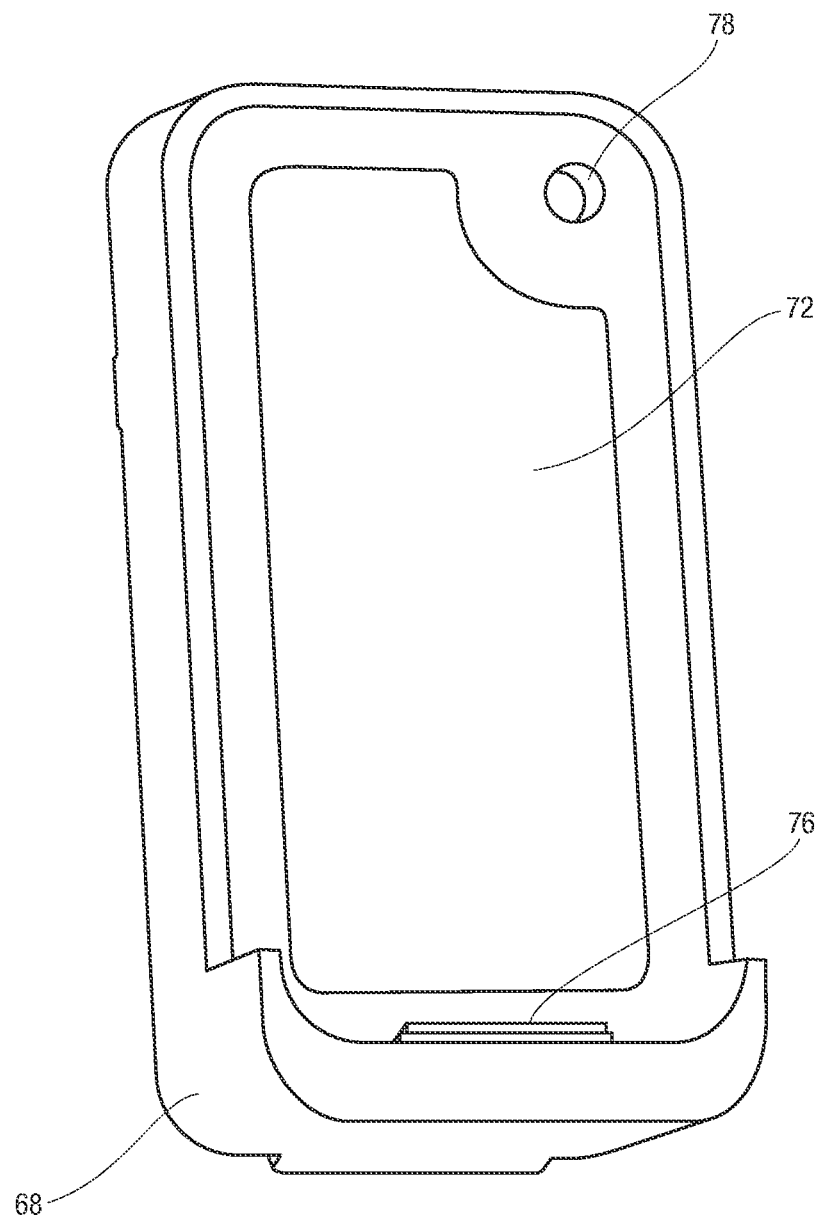
FIG. 4 is a perspective view of the rear housing portion of the biometric processing device showing the internal connector for wired communication with the wireless communication apparatus.
Figure 5:
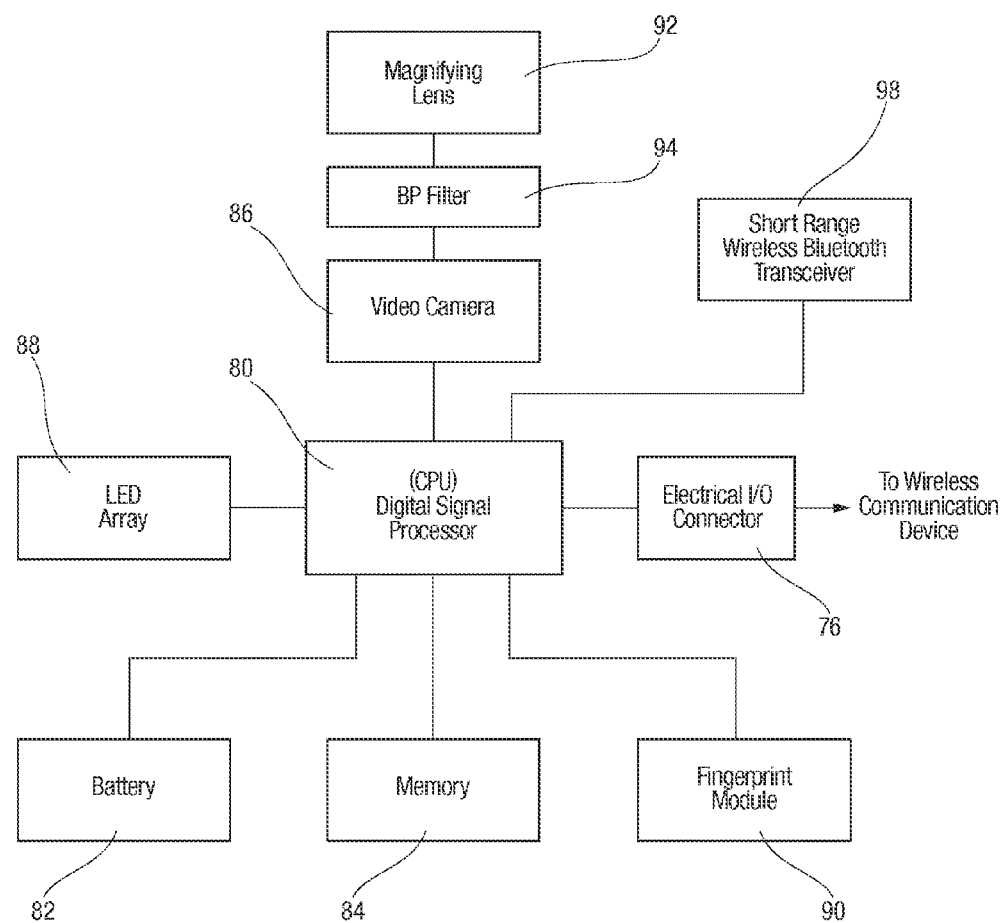
FIG. 5 is a schematic block diagram of the electronic components of the biometric processing device.

Referring to FIGS. 2 and 5, the biometric capture and processing device 14 comprises a central processing unit (CPU) 80, which is preferably a high power Digital Signal Processor (DSP) selected for high-speed processing of digital video images, a battery power supply 82, memory 84, a high quality digital camera 86 selected specifically for high quality video imaging of the iris, an LED array 88 for illuminating the iris, and a fingerprint capture module 90 for alternate or redundant biometric identification.

The iris camera 86 is provided with a magnifying lens 92 selected for close up imaging of the iris as well as a 780 nm band pass filter 94 for blocking unwanted light wavelengths. The LED array 88 includes infra-red LED's 94 which illuminate and enhance the structural features of the iris for image acquisition. The use of near IR illumination and band-pass filters for iris imaging is known in the art.

The front housing portion 70 includes a large window 96 to provide access to the touch screen display 50 of the wireless communication device 12 mounted therein.

Before turning to a description of the processes for acquiring and transmitting the images of the biometric attributes, we pause to briefly discuss communication between the hand-held communication device 12 (iPhone or otherwise) and the biometric processing device 14. There are two primary means of communication between the two devices. There is a direct wired connection between the I/O connector 54 of the wireless communication device 12 and the I/O connector 76 of the biometric processing device 14. This is the preferred path of communication since it provides a direct wired connection. This path is bi-directional wherein control input from the wireless communication device 12 is passed from the wireless communication device 12 to the biometric processing device 14 for control thereof.

However, with respect to the illustrated embodiment, Apple™, by design, throttles the speed of any image data being transferred to the iPhone 12, which controls any outside use of image and video data not acquired through the proprietary iTunes™ interface (Apple™ and iTunes™ are trademarks of Apple, Inc.). This restriction seriously impedes the speed at which the acquired biometric image 16 can be transferred from the biometric processing device 14 to the iPhone 12 for subsequent transfer to the back-end servers 22. Accordingly, the biometric processing device 14 further includes a short range wireless transceiver 98, for example, a Bluetooth transceiver, which wirelessly communicates with a like transceiver 62 (Bluetooth) in the wireless communication device 12 to transfers data between the devices 12,14. In this regard, all data in both directions is communicated through this wireless connection. Other short range transceivers are also contemplated, such as Ultra-Wide Broadband (UWB) transceivers.

Figure 10:
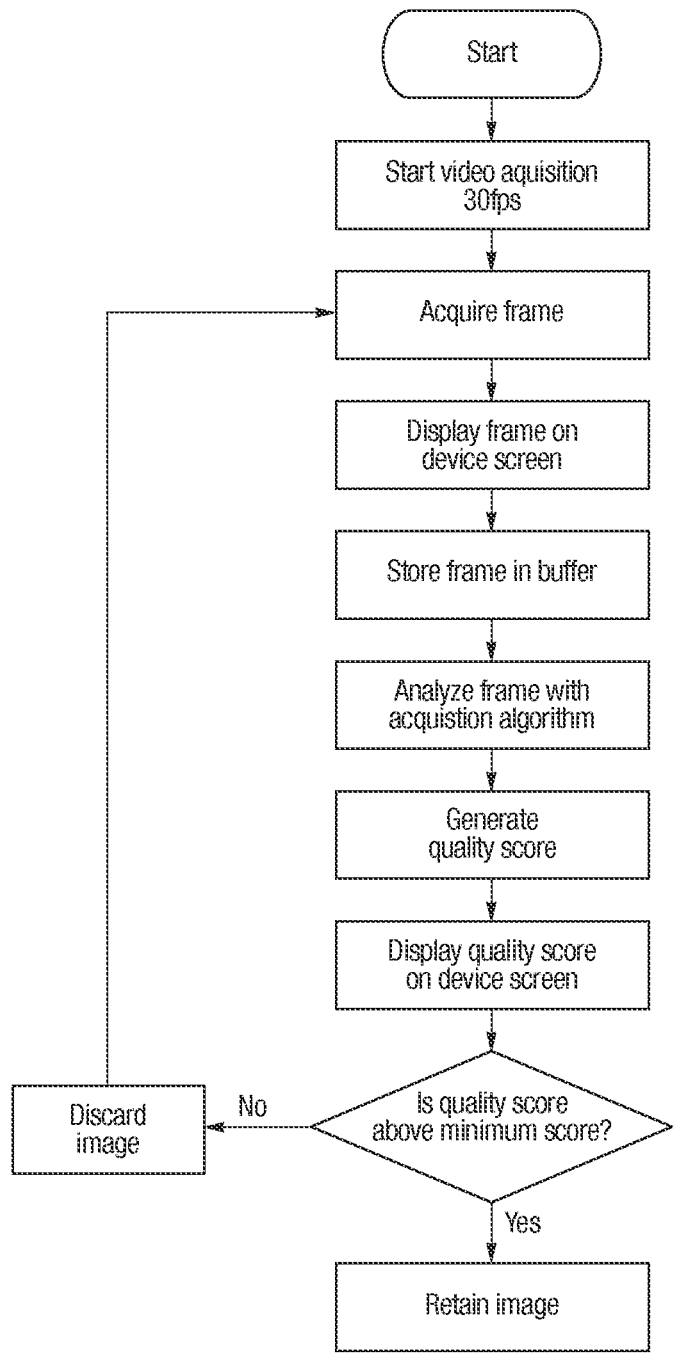
FIG. 10 is flow diagram illustrating the process for acquiring an iris image using the biometric processing device.
Figure 11:
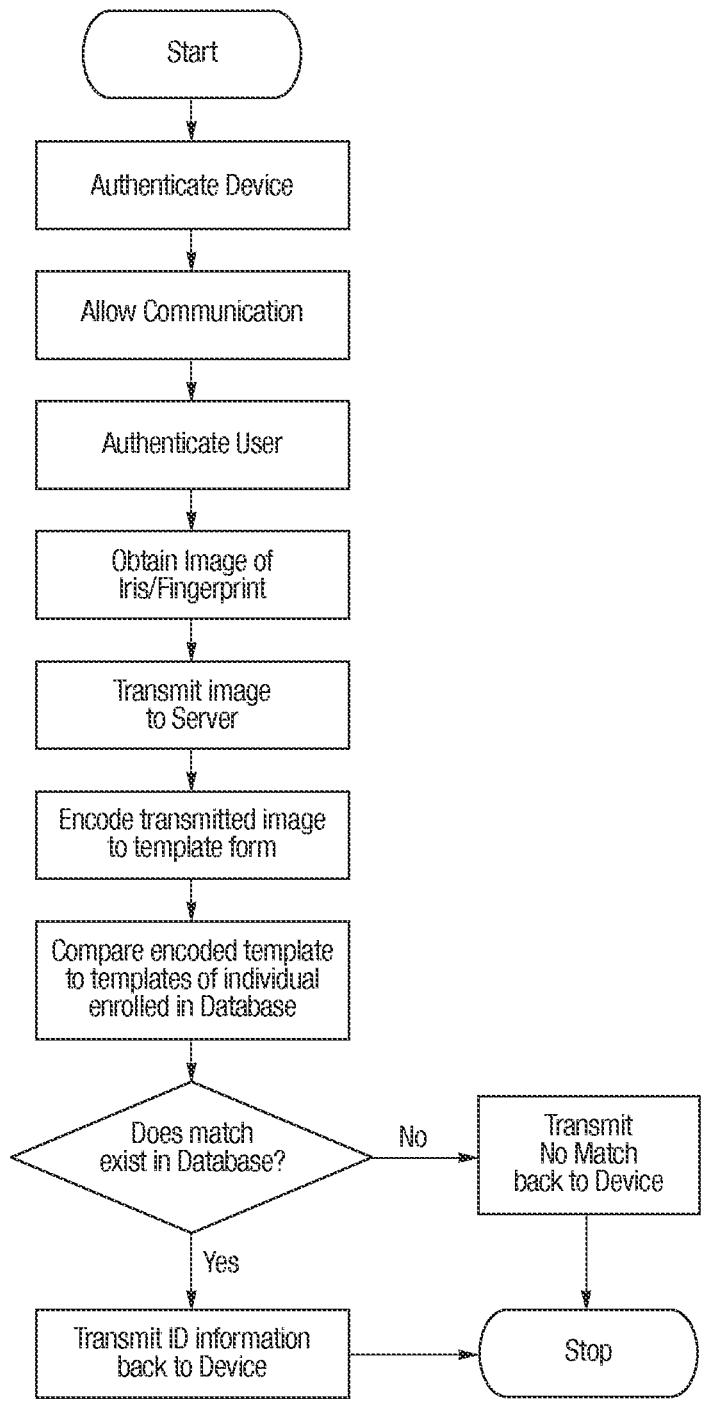
FIG. 11 is a flow diagram illustrating the overall process for acquiring the biometric attribute, transmitting the biometric attribute and verifying the identity of the individual from which the biometric attribute was acquired.

Turning to FIGS. 10, there is shown a representative flow chart illustrating the steps for acquiring an iris image. While acquisition of the iris image is the focus of FIG. 10, the flow chart represents the general process parameters for the acquisition of a fingerprint image as well.

As described hereinabove, the present system provides a unique division of processing where the hand-held biometric capture device 14 focuses on obtaining a high-quality image 16 of the biometric attribute, and the back end servers 22 are used to encode the image and compare the image. The division of processing power provides the ability to quickly obtain the biometric image 16 at the point of identification, and then once the image 16 is transmitted, the high-power servers 22, 30, 32 quickly process the image 16, encode the image 16 and compare it to the database(s) 34,36 for identification or verification of identification. Once the image 16 is transmitted to the servers, the servers can encode, compare and provide results in under 5 seconds. This unique division of resources and computing power allows the biometric capture device 14 to only focus on the critical job of obtaining a high-quality image for encoding.

Turning back to FIG. 10, there is a flow chart showing the basic process for acquiring the iris image. In this regard, the DSP runs its own internal software application to control acquisition of the biometric images. The iris image acquisition process uses a continuous stream of video images of the iris to obtain a high number of images for analysis and selection. Briefly, the DSP 80 selected for the biometric processing device is uniquely suited for high-speed video processing. Once the acquisition process is initiated, the DSP 80 receives a video stream from the iris camera 86 at a rate of 30 frames per second. Note, that other frame rates may also be used depending on the camera device 86, DSP 80 and biometric attribute. Once the acquisition stream is started, each frame is buffered, and analyzed for focus and quality. Each image 16 is given a quality score (qualified) based on an algorithm in the analyzing software. A critical aspects of the invention is that the DSP 80 is effective for analyzing each frame in real-time. As soon as one image 16 is acquired which meets a minimum quality score (qualified) it is temporarily stored into a memory location 84 and then transferred to the wireless communication device 12 through either the short range wireless connection (short range transceivers 62,98) iPhone™ or a wired I/O connections 54,76 (Android™ or other communication devices).

In an alternative, the biometric processing device 14 could analyze all of the frames as the video stream continues, and if another image receives a higher quality score, the stored image is discarded and the higher score image is stored in its place. Alternatively, multiple images might be stored. After a fixed period of time, for example 10 seconds of running video, the acquisition process terminates.

The fingerprint acquisition process is generally the same, except it is not based on a stream of video frames. Rather the user places a finger onto the fingerprint pad and the DSP initiates a routine which scans the fingerprint to obtain an appropriate fingerprint image according to the specifications of the fingerprint module. The operation of such fingerprint modules 90 is well-known in the art.

If at least one image 16 meeting the minimum quality score is acquired, the image 16 is then be transmitted to the servers 22,30,32 through the communication link, encoded at the servers, and compared to the database(s). Results of the comparison are then transmitted back to the device 10 along with additional information corresponding to the end user needs. As indicated above, police officers, sheriffs or border patrol agents may receive information relating to prior arrests or outstanding warrants, military personnel in the field may receive priority security alerts once a person is identified, or a nurse, doctor or EMT in the field could receive critical health care information for an injured person. The system 10 could also find everyday use in the healthcare industry to confirm the identity of sedated individuals prior to surgery or prior to dispensing of medicines. Law enforcement agencies can use the system 10 to verify the identity of offenders being booked into the criminal justice system or being released from the criminal justice system. Incidences of identify fraud in prison releases is a growing concern.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and describe.

What is claimed is:

1. A biometric processing and communication system comprising:
    a handheld wireless communication device comprising
        a housing having an external surface,
        a central processing unit,
        a battery power source,
        a touch screen display,
        a long range wireless communication transceiver, and
        a short range wireless communication transceiver;
    a biometric processing device comprising
        a housing having
            an interior cavity contoured to conform to said exterior surface of said housing of said handheld wireless communication device, and
            a window in a front surface thereof in communication with said interior cavity,
            said handheld wireless communication device being removably seated in mated relation within said interior cavity of said housing wherein said touch screen display of said handheld wireless communication device is accessible through said window of said housing of said biometric processing device,
    said biometric processing device further comprising
        a biometric capture module,
        a short range wireless communication transceiver,
        a central processing unit,
        a software application running on said central processing unit operative for
            sending data to and receiving data from said wireless communication device through said short range wireless communication transceivers,
            controlling said biometric capture module to capture an image of a biometric attribute of a person to be identified,
            qualifying said captured image as being of acceptable quality for encoding into a biometric template,
            transferring said qualified image to said wireless communication device, and
        a battery power source; and
    a software application running on said central processing unit of said handheld wireless communication device operative for providing a graphical user interface on said touch screen display for control of said biometric processing device and said wireless communication device, said software application
        receiving control input from a user through said touch screen display,
        communicating said control input to said central processing unit of said biometric processing device through said short range wireless communication transceiver,
        receiving said qualified image from said biometric processing device,
        controlling communication with a communication network through said long range wireless communication transceiver,
        controlling communication with a remote computer network connected to said communication network,
        transmitting said qualified image over said communication network to said computer network for encoding said qualified image to a biometric attribute template and comparison of said encoded biometric attribute template to a plurality of reference templates stored in said network accessible database,
        receiving identification data from said computer network over said communication network responsive to said comparison, and
        displaying said identification data on said touch screen display,
    wherein said biometric attribute comprises an iris, and
    wherein said biometric capture module comprises:
        a digital video camera for generating a stream of video images;
        a magnifying lens for enlarging said iris;
        an infra-red lighting element for illuminating said iris; and
        a band pass filter reducing unwanted wavelengths of light,
        said central processing unit of said biometric processing device comprising a digital signal processor which acquires and analyzes each of said video images for quality until a qualified image is identified.

2. The biometric processing and communication system of claim 1 further comprising a second biometric capture module for capturing a second biometric attribute of said individual to be identified, said second biometric attribute comprising a fingerprint, said second biometric capture module comprising a fingerprint capture module.

3. The biometric processing and communication system of claim 1, wherein said wireless communication device includes a digital camera having a lens on said exterior surface thereof, said housing of said biometric processing device having a camera window in communication with said interior cavity, said lens being located within said camera window of said housing when said wireless communication device is seated within said interior cavity.

4. The biometric processing and communication system of claim 1 wherein said long range wireless transceiver is selected from the group consisting of: cellular transceivers, Wi-Fi transceivers and RF transceivers.

5. The biometric processing and communication system of claim 1 wherein said short range wireless transceivers are selected from the group consisting of: Bluetooth transceivers and ultra-wide band (UWB) transceivers.

6. The biometric processing and communication system of claim 4 wherein said short range wireless transceivers are selected from the group consisting of: Bluetooth transceivers and ultra-wide band (UWB) transceivers.

7. A biometric processing and communication system comprising:
   a handheld wireless communication device comprising
      a housing having an external surface,
      a central processing unit,
      a battery power source,
      a touch screen display,
      a long range wireless communication transceiver and
      an electrical input/output (I/O) connector;
   a biometric processing device comprising
      a housing having
         an interior cavity contoured to conform to said exterior surface of said housing of said handheld wireless communication device,
         a docking port including an electrical input/output (I/O) connector within said interior cavity, and
         a window in a front surface thereof in communication with said interior cavity,
         said handheld wireless communication device being removably seated in mated relation within said interior cavity of said housing
         wherein said electrical I/O connector of said handheld wireless communication device is mated with said electrical I/O connector of said biometric processing device,
         and further wherein said touch screen display of said handheld communication device is accessible through said window of said housing of said biometric capture device,
   said biometric processing device further comprising
      a biometric capture module,
      a central processing unit,
      a software application running on said central processing unit operative for
         sending data to and receiving data from said wireless communication device through said mated electrical I/O connectors,
         controlling said biometric capture module to capture an image of a biometric attribute of a person to be identified,
         qualifying said captured image as being of acceptable quality for encoding into a biometric template,
         transferring said qualified image to said wireless communication device, and
      a battery power source; and
   a software application running on said central processing unit of said handheld wireless communication device operative for providing a graphical user interface on said touch screen display for control of said biometric processing device and said wireless communication device, said software application
      receiving control input from a user through said touch screen display,
      communicating said control input to said central processing unit of said biometric processing device through said mated electrical I/O connectors,
      receiving said qualified image from said biometric processing device,
      controlling communication with a communication network through said long range wireless communication transceiver,
      controlling communication with a remote computer network connected to said communication network,
      transmitting said qualified image over said communication network to said computer network for encoding said qualified image to a biometric attribute template and comparison of said encoded biometric attribute template to a plurality of reference templates stored in said network accessible database,
      receiving identification data from said computer network over said communication network responsive to said comparison, and
      displaying said identification data on said touch screen display,
   wherein said biometric attribute comprises an iris, and
   wherein said biometric capture module comprises:
      a digital video camera for generating a stream of video images;
      a magnifying lens for enlarging said iris;
      an infra-red lighting element for illuminating said iris; and
      a band pass filter reducing unwanted wavelengths of light,
      said central processing unit of said biometric processing device comprising a digital signal processor which acquires and analyzes each of said video images for quality until a qualified image is identified.

8. The biometric processing and communication system of claim 7 further comprising a second biometric capture module for capturing a second biometric attribute of said individual to be identified, said second biometric attribute comprising a fingerprint, said second biometric capture module comprising a fingerprint capture module.

9. The biometric processing and communication system of claim 7, wherein said wireless communication device includes a digital camera having a lens on said exterior surface thereof, said housing of said biometric processing device having a camera window in communication with said interior cavity, said lens being located within said camera window of said housing when said wireless communication device is seated within said interior cavity.

10. The biometric processing and communication system of claim 7 wherein said long range wireless transceiver is selected from the group consisting of: cellular transceivers, Wi-Fi transceivers and RF transceivers.

11. A biometric identification system comprising:
   a wireless communication network;
   a computer network in communication with said communications network;
   a network accessible database storing a plurality of database records, each database record including personal data associated with an individual and at least one biometric reference template associated with said individual;
   a computer server in communication with said computer network,
   software on said computer server for encoding a qualified biometric image to a unique biometric template;

software on said computer server for comparing said encoded template to said plurality of references templates;
a handheld wireless communication device comprising
a housing having an external surface,
a central processing unit,
a battery power source,
a touch screen display,
a long range wireless communication transceiver and
a short range wireless communication transceiver;
a biometric processing device comprising
a housing having
an interior cavity contoured to conform to said exterior surface of said housing of said handheld wireless communication device, and
a window in a front surface thereof in communication with said interior cavity,
said handheld wireless communication device being removably seated in mated relation within said interior cavity of said housing wherein said touch screen display of said handheld communication device is accessible through said window of said housing of said biometric capture device,
said biometric processing device further comprising
a biometric capture module,
a short range wireless communication transceiver,
a central processing unit,
a software application running on said central processing unit operative for
sending data to and receiving data from said wireless communication device through said short range wireless communication transceivers,
controlling said biometric capture module to capture an image of a biometric attribute of a person to be identified,
qualifying said captured image as being of acceptable quality for encoding into a biometric template,
transferring said qualified image to said wireless communication device, and
a battery power source; and
a software application running on said central processing unit of said handheld wireless communication device operative for providing a graphical user interface on said touch screen display for control of said biometric processing device and said wireless communication device,
said software application
receiving control input from a user through said touch screen display,
communicating said control input to said central processing unit of said biometric processing device through said short range wireless communication transceiver,
receiving said qualified image from said biometric processing device,
controlling communication with said communication network through said long range wireless communication transceiver,
controlling communication with said computer network connected to said communication network,
transmitting said qualified image over said communication network to said computer server for encoding said qualified image to a biometric attribute template and comparison of said encoded biometric attribute template to said plurality of reference templates stored in said network accessible database,
receiving identification data from said computer server through said computer network and said communication network responsive to said comparison, and
displaying said identification data on said touch screen display,
wherein said biometric attribute comprises an iris, and
wherein said biometric capture module comprises:
a digital video camera for generating a stream of video images;
a magnifying lens for enlarging said iris;
an infra-red lighting element for illuminating said iris; and
a band pass filter reducing unwanted wavelengths of light,
said central processing unit of said biometric processing device comprising a digital signal processor which acquires and analyzes each of said video images for quality until a qualified image is identified.

12. The biometric identification system of claim 11 further comprising a second biometric capture module for capturing a second biometric attribute of said individual to be identified, said second biometric attribute comprising a fingerprint, said second biometric capture module comprising a fingerprint capture module.

13. The biometric identification system of claim 11, wherein said wireless communication device includes a digital camera having a lens on said exterior surface thereof, said housing of said biometric processing device having a camera window in communication with said interior cavity, said lens being located within said camera window of said housing when said wireless communication device is seated within said interior cavity.

14. The biometric identification system of claim 11 wherein said communication system is selected from the group consisting of: a cellular communication system, a Wi-Fi communication system and an RF communication system.

15. The biometric identification system of claim 14 wherein said communication system comprises a cellular communication system and said long range transceiver comprises a cellular transceiver.

16. The biometric identification system of claim 14 wherein said communication system comprises a Wi-Fi communication system and said long range transceiver comprises a Wi-Fi transceiver.

17. The biometric identification system of claim 14 wherein said communication system comprises an RF communication system and said long range transceiver comprises an RF transceiver.

18. The biometric processing and communication system of claim 11 wherein said short range wireless transceivers are selected from the group consisting of: Bluetooth transceivers and ultra-wide band (UWB) transceivers.

19. The biometric processing and communication system of claim 14 wherein said short range wireless transceivers are selected from the group consisting of: Bluetooth transceivers and ultra-wide band (UWB) transceivers.

20. A biometric identification system comprising:
a wireless communication network;
a computer network in communication with said communications network;
a network accessible database storing a plurality of database records, each database record including personal data associated with an individual and at least one biometric reference template associated with said individual;

a computer server in communication with said computer network,
software on said computer server for encoding a qualified biometric image to a unique biometric template;
software on said computer server for comparing said encoded template to said plurality of references templates;
a handheld wireless communication device comprising
a housing having an external surface,
a central processing unit,
a battery power source,
a touch screen display,
a long range wireless communication transceiver and
an electrical input/output (I/O) connector;
a biometric processing device comprising
a housing having
an interior cavity contoured to conform to said exterior surface of said housing of said handheld wireless communication device
a docking port including an electrical input/output (I/O) connector within said interior cavity, and
a window in a front surface thereof in communication with said interior cavity,
said handheld wireless communication device being removably seated in mated relation within said interior cavity of said housing
wherein said electrical I/O connector of said handheld communication device is mated with said electrical I/O connector of said biometric processing device, and further wherein said touch screen display of said handheld communication device is accessible through said window of said housing of said biometric capture device,
said biometric processing device further comprising
a biometric capture module,
a central processing unit,
a software application running on said central processing unit operative for
sending data to and receiving data from said wireless communication device through said mated electrical I/O connectors,
controlling said biometric capture module to capture an image of a biometric attribute of a person to be identified,
qualifying said captured image as being of acceptable quality for encoding into a biometric template,
transferring said qualified image to said wireless communication device, and
a battery power source; and
a software application running on said central processing unit of said handheld wireless communication device operative for providing a graphical user interface on said touch screen display for control of said biometric processing device and said wireless communication device,
said software application
receiving control input from a user through said touch screen display,
communicating said control input to said central processing unit of said biometric processing device through said mated electrical I/O connectors,
receiving said qualified image from said biometric processing device,
controlling communication with said communication network through said long range wireless communication transceiver,
controlling communication with said computer network connected to said communication network,
transmitting said qualified image over said communication network to said computer server for encoding said qualified image to a biometric attribute template and comparison of said encoded biometric attribute template to said plurality of reference templates stored in said network accessible database,
receiving identification data from said computer server through said computer network and said communication network responsive to said comparison, and
displaying said identification data on said touch screen display,
wherein said biometric attribute comprises an iris, and
wherein said biometric capture module comprises:
a digital video camera for generating a stream of video images;
a magnifying lens for enlarging said iris;
an infra-red lighting element for illuminating said iris; and
a band pass filter reducing unwanted wavelengths of light,
said central processing unit of said biometric processing device comprising a digital signal processor which acquires and analyzes each of said video images for quality until a qualified image is identified.

21. The biometric identification system of claim 20 further comprising a second biometric capture module for capturing a second biometric attribute of said individual to be identified, said second biometric attribute comprising a fingerprint, said second biometric capture module comprising a fingerprint capture module.

22. The biometric identification system of claim 20, wherein said wireless communication device includes a digital camera having a lens on said exterior surface thereof, said housing of said biometric processing device having a camera window in communication with said interior cavity, said lens being located within said camera window of said housing when said wireless communication device is seated within said interior cavity.

23. The biometric identification system of claim 20 wherein said communication system is selected from the group consisting of: a cellular communication system, a Wi-Fi communication system and an RF communication system.

24. The biometric identification system of claim 23 wherein said communication system comprises a cellular communication system and said long range transceiver comprises a cellular transceiver.

25. The biometric identification system of claim 23 wherein said communication system comprises a Wi-Fi communication system and said long range transceiver comprises a Wi-Fi transceiver.

26. A method of identifying a person based on a biometric identifier comprising the steps of:
providing a handheld wireless communication device comprising
a housing having an external surface,
a central processing unit,
a battery power source,
a touch screen display,
providing a biometric processing device comprising
a housing having
an interior cavity contoured to conform to said exterior surface of said housing of said handheld wireless communication device, and
a window in a front surface thereof in communication with said interior cavity, said handheld wireless communication device being removably seated in mated relation within said interior cavity of said housing wherein said touch screen display of said handheld communication device is accessible through said window of said housing of said biometric capture device, said biometric processing device further comprising
a battery power source,
a biometric capture module, and
a central processing unit;

receiving control input from a user through said touch screen display of said handheld wireless communication device;

communicating said control input to said central processing unit of said biometric processing device;

controlling said biometric capture module responsive to said control input to capture an image of a biometric attribute of a person to be identified;

qualifying, on said biometric processing device, said captured image as being of acceptable quality for encoding into a biometric template;

transferring said qualified image to said wireless communication device;

communicating with a wireless communication network through said long range wireless communication transceiver, communicating with a computer network connected to said wireless communication network, transmitting said qualified image over said communication network to said computer network;

encoding said qualified image to a biometric attribute template on a server connected to said computer network;

comparing at said server said encoded biometric attribute template to a plurality of reference templates stored in a network accessible database;

receiving identification data on said handheld wireless communication device responsive to said comparison; and displaying said identification data on said touch screen display, wherein said biometric attribute comprises an iris, and
wherein said biometric capture module comprises:
a digital video camera for generating a stream of video images;
a magnifying lens for enlarging said iris;
an infra-red lighting element for illuminating said iris; and
a band pass filter reducing unwanted wavelengths of light,
said central processing unit of said biometric processing device comprising a digital signal processor which acquires and analyzes each of said video images for quality until a qualified image is identified.

27. The method of claim 26 wherein said control input is communicated wirelessly from said handheld wireless communication device to said biometric processing device.

28. The method of claim 26 wherein said control input is communicated through a wired connection from said handheld wireless communication device to said biometric processing device.

29. The method of claim 26 wherein said image is transmitted wirelessly from said biometric processing device to said handheld wireless communication device.

30. The method of claim 26 wherein said image is transmitted through a wired connection from said biometric processing device to said handheld wireless communication device.

* * * * *